(12) United States Patent
Tonosaki et al.

(10) Patent No.: US 10,137,911 B2
(45) Date of Patent: Nov. 27, 2018

(54) RUNNING CURVE CREATION DEVICE, RUNNING CURVE CREATION METHOD AND RUNNING CURVE CONTROL PROGRAM

(71) Applicant: KABUSHIKI KAISHA TOSHIBA, Minato-ku, Tokyo (JP)

(72) Inventors: Yukinori Tonosaki, Tokyo (JP); Junko Yamamoto, Kanagawa-ken (JP); Tatsunori Suzuki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/994,904

(22) Filed: Jan. 13, 2016

(65) Prior Publication Data

US 2016/0129926 A1    May 12, 2016

Related U.S. Application Data

(63) Continuation of application No. PCT/JP2013/005289, filed on Sep. 6, 2013.

(30) Foreign Application Priority Data

Jul. 19, 2013   (JP) ................................. 2013-151104

(51) Int. Cl.
*G09B 9/04*      (2006.01)
*B61L 3/00*      (2006.01)
(Continued)

(52) U.S. Cl.
CPC ........... *B61L 3/006* (2013.01); *B61L 27/0027* (2013.01); *G05D 1/0016* (2013.01); *Y02T 10/7258* (2013.01)

(58) Field of Classification Search
None
See application file for complete search history.

(56) References Cited

U.S. PATENT DOCUMENTS 8,370,006 B2 *   2/2013   Kumar .................... B61L 3/006
                                                    701/19
8,374,739 B2 *   2/2013   Yamamoto .......... B61L 27/0027
                                                    246/182 C
(Continued)

FOREIGN PATENT DOCUMENTS

AU    2008201906 A1   5/2008
CN       1511744 A    7/2004
(Continued)

OTHER PUBLICATIONS

Chinese Office Action (and English translation thereof) dated Sep. 6, 2016, issued in counterpart Chinese Application No. 201380078342.9.

(Continued)

*Primary Examiner* — Thomas G Black
*Assistant Examiner* — Demetra R Smith-Stewart
(74) *Attorney, Agent, or Firm* — Holtz, Holtz & Volek PC

(57) ABSTRACT

A running curve creation device of an embodiment is a running curve creation device to create a running curve which can make a train having a prescribed vehicle characteristic run between a prescribed departure station and a prescribed arrival station in a prescribed running time with a smaller cumulative energy consumption. A shortest time running curve creation unit creates a shortest time running curve in which the train runs between the stations in a shortest time, based on predetermined vehicle information and ground information of the train, and an energy saving running curve creation unit selects from the shortest time running curve and a plurality of solution candidates corresponding to states of the train at each prescribed elapsed (Continued)

time since the train has departed from the departure station, a solution candidate having the relatively small cumulative energy consumption in the prescribed running time, and creates an energy saving running curve based on the selected solution candidate.

14 Claims, 15 Drawing Sheets

(51) Int. Cl.
*B61L 27/00* (2006.01)
*G05D 1/00* (2006.01)

(56) References Cited

U.S. PATENT DOCUMENTS

| | | | | |
|---|---|---|---|---|
| 8,751,073 | B2* | 6/2014 | Kumar | B61L 3/006 701/19 |
| 8,831,801 | B1* | 9/2014 | Raghunathan | G06F 17/11 700/291 |
| 8,838,304 | B2* | 9/2014 | Xu | B61L 3/006 246/182 R |
| 9,193,364 | B2* | 11/2015 | Kumar | B61C 17/12 |
| 9,205,851 | B2* | 12/2015 | Yoshimoto | B61L 27/0027 |
| 9,233,622 | B2* | 1/2016 | Kumar | B60L 11/1851 |
| 2007/0219680 | A1* | 9/2007 | Kumar | B61L 3/006 701/19 |
| 2009/0234521 | A1* | 9/2009 | Kumar | B60L 11/1851 701/19 |
| 2014/0005876 | A1* | 1/2014 | Xu | B61L 3/006 701/29.1 |
| 2014/0005877 | A1* | 1/2014 | Xu | G06F 17/00 701/29.1 |
| 2014/0222259 | A1* | 8/2014 | Yoshimoto | B61L 27/0027 701/20 |
| 2014/0277861 | A1* | 9/2014 | Raghunathan | B61L 99/00 701/19 |
| 2017/0120937 | A1* | 5/2017 | Sameda | B60L 15/40 |

FOREIGN PATENT DOCUMENTS

| | | | |
|---|---|---|---|
| CN | 1772545 A | 5/2006 | |
| CN | 101607559 A | 12/2009 | |
| CN | 102887150 A | 1/2013 | |
| DE | 102011106440 A1 | 1/2013 | |
| EP | 0467377 A2 | 1/1992 | |
| EP | 0539885 A2 * | 5/1993 | ............. B60L 3/006 |
| EP | 0539885 A2 * | 5/1993 | ............. B61L 3/006 |
| EP | 0467377 B1 * | 6/1997 | ............. B60L 3/006 |
| JP | 07165080 A | 6/1995 | |
| JP | H08156794 A | 6/1996 | |
| JP | 2005176568 A | 6/2005 | |

OTHER PUBLICATIONS

Ko, et al., "Numerical Study on Dynamic Programming Applied to Optimization of Running Profile of a Train", IEEJ Trans. IA, vol. 125, No. 12, Dec. 31, 2005, pp. 1084-1092.

Ichikawa, "Optimization of Train Operation", The Japan Society of Mechanical Engineers Collected Papers (Part 1), vol. 34 No. 258, 1968, 308-319.

Kawashima, et al., "Creation of Optimum Train Operation System and Proposal of Correcting Method", The Institute of Electrical Engineers of Japan, 1990, 18-25.

Koseki, et al., "Application of the Dynamic Programming to a Calculation of Optimal Energy-Saving Running Profile of a Train and Problems in its Numerical Implementation", The Institute of Electrical Engineers of Japan, 2002, 16-21.

Takagi, et al., "Research on Energy Saving Operation Pattern for Train Group Control", The Institute of Electrical Engineers of Japan, 1992, 60-69.

Yamasaki, et al., "Optimum Running Curve Calculation by Dynamic Programming", Cybernetics, 1968, 11-17.

English translation of a Japanese Office Action dated Jan. 10, 2017 issued in counterpart Japanese Application No. 2013-151104.

Extended European Search Report (EESR) dated Mar. 10, 2017, issued in counterpart European Application No. 13889480.3.

Japanese Office Action dated Jan. 10, 2017 issued in counterpart Japanese Application No. 2013-151104.

* cited by examiner

| 50 | | | | | | |
|---|---|---|---|---|---|---|
| 51 | 52 | 53 | 54 | 55 | 56 | 57 |
| VEHICLE ID DATA | TYPE DATA | VEHICLE BODY WEIGHT DATA | RIDING RATE DATA | FORMATION VEHICLE NUMBER DATA | TRAIN LENGTH DATA | NOTCH CHARACTERISTIC ID DATA |
| 5 | VVVF | 10t | 50% | 10 | 200m | 5 |

16

| VEHICLE ID | 5 | GROUND ID | 11 | RUNNING TIME | |
|---|---|---|---|---|---|
| TYPE | VVVF | BETWEEN-STATION INFORMATION | A STATION ⇒ B STATION | SHORTEST RUNNING TIME | 90[sec] |
| VEHICLE BODY WEIGHT | 10t | | | RUNNING TIME | 100[sec] |
| RIDING RATIO | 50% | | | | |
| FORMATION VEHICLE NUMBER | 10% | | | | |
| TRAIN LENGTH | 200[m] | | | | |

| TIME | VELOCITY | POSITION | INSTANTANEOUS POWER | CUMULATIVE POWER | NOTCH NUMBER |
|---|---|---|---|---|---|
| 0 | 0 | 0 | 0 | 0 | 0 |
| 1 | 0.905363 | 0.452715 | 0.633754 | 0.633754 | 0 |
| 2 | 1.810326 | 1.810593 | 1.900982 | 2.534736 | 0 |
| 3 | 2.714888 | 4.073233 | 3.16765 | 5.702386 | 0 |
| 4 | 3.619051 | 7.240236 | 4.433757 | 10.136143 | 0 |
| 5 | 4.522813 | 11.311201 | 5.699304 | 15.835447 | 0 |
| 6 | 5.426176 | 16.285728 | 6.964292 | 22.79974 | 0 |
| 7 | 6.329139 | 22.163419 | 8.228721 | 31.02846 | 0 |
| 8 | 7.231703 | 28.943874 | 9.49259 | 40.52105 | 0 |
| 9 | 8.133868 | 36.626692 | 10.7559 | 51.27695 | 0 |
| 10 | 9.035634 | 45.211476 | 12.018651 | 63.295601 | 0 |
| 11 | 9.937001 | 54.697827 | 13.280844 | 76.576445 | 0 |
| 12 | 10.837969 | 65.085345 | 14.542479 | 91.118924 | 0 |
| 13 | 11.738539 | 76.373633 | 15.803556 | 106.92248 | 0 |
| 14 | 12.638711 | 88.562291 | 17.064075 | 123.986555 | 0 |
| 15 | 13.538484 | 101.650922 | 18.324037 | 142.310592 | 0 |
| 16 | 14.43786 | 115.639127 | 19.583441 | 161.894033 | 0 |
| 17 | 15.336838 | 130.526509 | 20.842289 | 182.736321 | 0 |
| 18 | 16.235418 | 146.31267 | 22.100579 | 204.836901 | 0 |
| 19 | 17.133601 | 162.997213 | 23.358314 | 228.195214 | 0 |
| 20 | 18.031387 | 180.57974 | 24.615492 | 252.810706 | 0 |

FIG. 16

RUNNING CURVE CREATION DEVICE, RUNNING CURVE CREATION METHOD AND RUNNING CURVE CONTROL PROGRAM

CROSS-REFERENCE TO RELATED APPLICATION

This application is a continuation application of International Patent Application No. PCT/JP2013/005289, filed on Sep. 6, 2013.

This application is based upon and claims the benefit of priority from the prior Japanese Patent Application No. 2013-151104, filed on Jul. 19, 2013; the entire contents of which are incorporated herein by reference.

FIELD

The present embodiment relates to a running curve creation device, a running curve creation method and a running curve control program.

BACKGROUND

Further energy saving (hereinafter, simply called energy saving) has been demanded for a railway with excellent energy efficiency, due to power shortage in recent years. That is, the energy saving in a railway is to change an auxiliary machine such as air-conditioning and lighting to an equipment with excellent energy efficiency, and to reduce energy at the time of running of a train, and so on. Particularly, the energy saving at the time of running of a train has been considered since long ago, and it has variously been discussed in the reference documents listed below.

Generally, the following three policies are taken in many cases, in the energy saving relating to an operation of a train.

(1) To accelerate a train at a maximum acceleration at the time of departing from a departure station.

(2) To preferably increase coasting (inertia running) within a speed limitation.

(3) To decelerate a train at a maximum deceleration at the time of reaching a station.

Regarding these fundamental policies, various energy saving running curve creation methods have been proposed so far. In order to create a running curve based on these fundamental policies, many methods to create a running curve by a heuristic have been proposed. However, in a case that a speed limitation is simple such as one maximum speed exists between stations, and in a case that a running time is larger compared with a shortest time, a running curve close to an optimum running curve can be obtained even by a heuristic. However, in a case that the speed limitation between stations is complicated, when a running curve is created by a heuristic, there is a case that a solution cannot be obtained, or only a solution may be obtained in which the energy consumption is considerably larger than an optimum solution. For the reason, a method which can obtain a solution close to an optimum solution has been desired, even if a given speed limitation and gradient are complicated.

BRIEF DESCRIPTION OF THE DRAWINGS

FIG. 16 is an explanation diagram of a format and a data example of the storage data of the running curve creation result storage unit.

DETAILED DESCRIPTION

A running curve creation device of an embodiment creates a running curve which can make a train having a prescribed vehicle characteristic run between a prescribed departure station and a prescribed arrival station in a prescribed running time with a smaller cumulative energy consumption.

And, a shortest time running curve creation unit creates a shortest time running curve in which the train runs between the stations in a shortest time (shortest running time), based on predetermined vehicle information and ground information of the train.

By this means, an energy saving running curve creation unit selects, from the shortest time running curve and a plurality of solution candidates corresponding to states of the train at each prescribed elapsed time since the train has departed from the departure station a solution candidate having the relatively small cumulative energy consumption in the prescribed running time, and creates an energy saving running curve based on the selected solution candidate.

A running curve creation device of an embodiment can provide a running curve creation device capable of creating a running curve closer to an optimum solution at high speed.

Next, further detailed embodiments will be described in detail with reference to the drawings.

Figure 1:
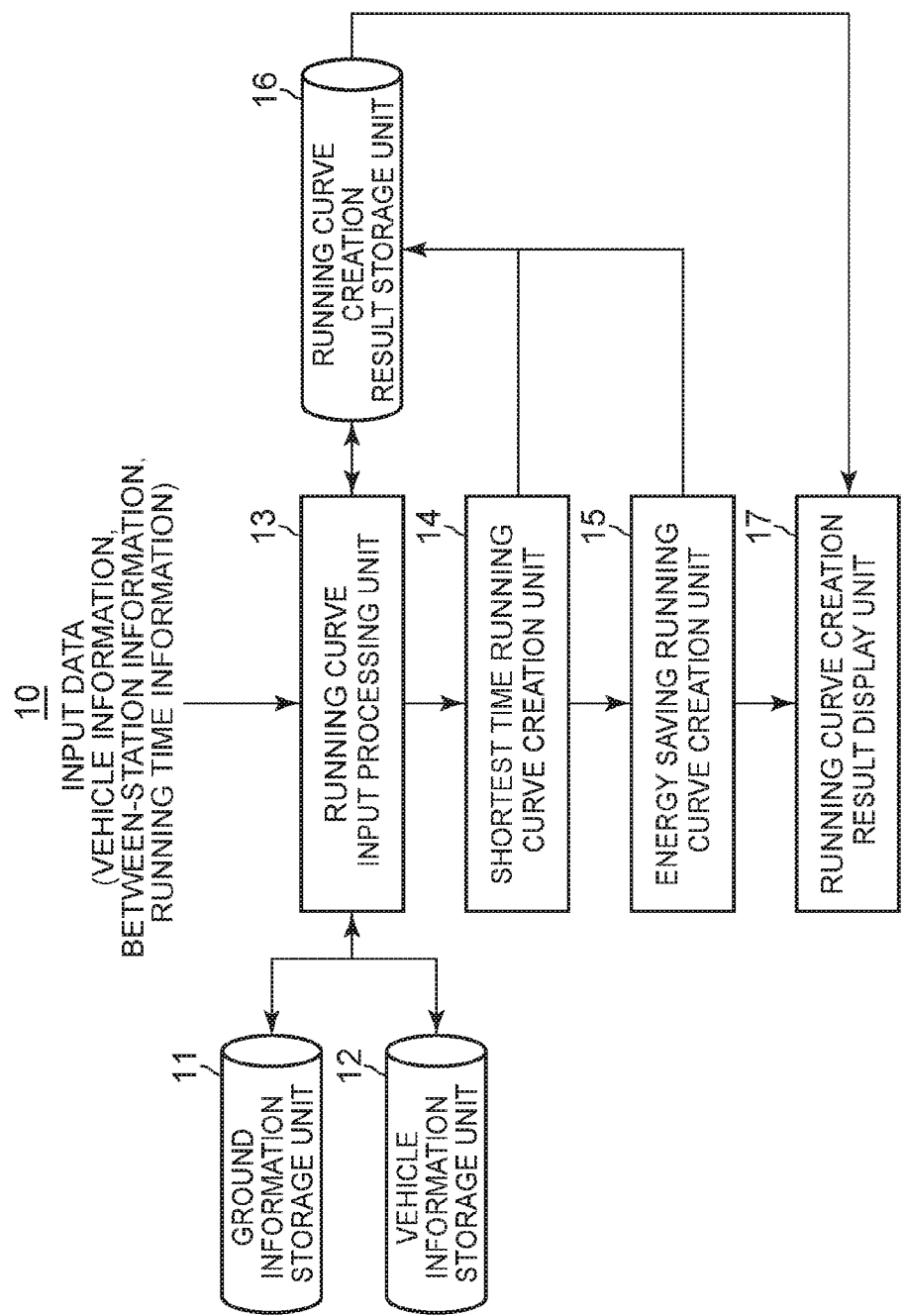
FIG. 1 is a schematic configuration diagram of a running curve creation device.

FIG. 1 is a schematic configuration block diagram of a running curve creation device.

A running curve creation device 10 is provided with a ground information storage unit 11 which previously stores ground information data described later to become necessary for creating a running curve, a vehicle information storage unit 12 which previously stores vehicle information data described later to become necessary for creating the running curve, a running curve input processing unit 13 which inputs various data such as vehicle information, between-station information, running time information, acquires the ground information data to become necessary for creating the running curve based on the inputted data from the ground information storage unit 11, and acquires the vehicle information data from the vehicle information storage unit 12, a shortest time running curve creation unit 14 which creates a shortest time running curve for running a train between designated stations in a shortest time, by a vehicle condition designated based on the various data inputted from the running curve input processing unit 13, an energy saving running curve creation unit 15 to create an energy saving running curve which makes a train run between the designated stations in the designated running time based on the shortest time running curve, and can achieve energy saving, a running curve creation result storage unit 16 which stores the shortest time running curve which the shortest time running curve creation unit 14 has created, and the running curve which the energy saving running curve creation unit 15 has created, and a running curve creation result display unit 17 to display the running curve creation result which the energy saving running curve creation unit 15 has created.

In the present embodiment, it is supposed that the running curve is created by a general-purpose personal computer or the like.

Figure 2:
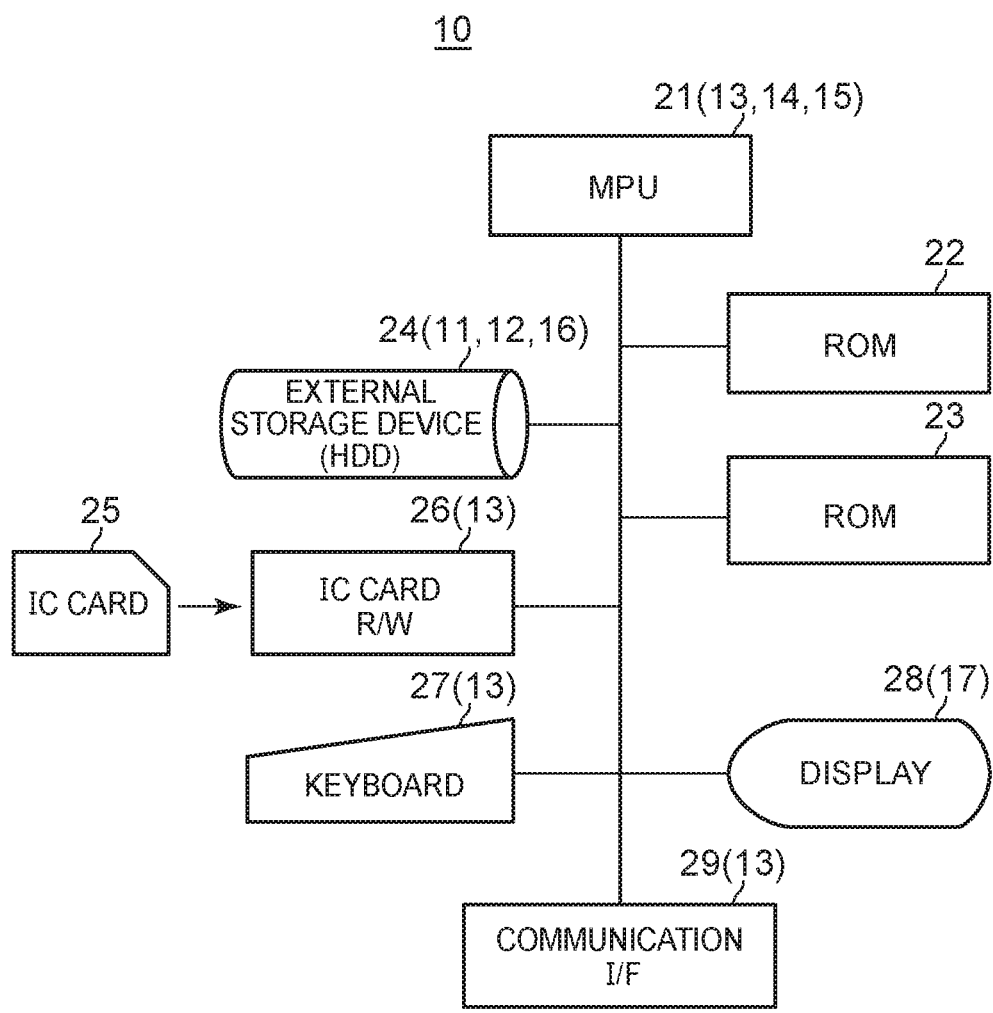
FIG. 2 is a schematic configuration diagram of the running curve creation device when it is configured by a personal computer.

FIG. 2 is a schematic configuration block diagram of the running curve creation device when it is configured by a personal computer.

As shown in FIG. 2, the running curve creation device 10 is provided with an MPU 21 which is configured as a microcomputer to control the whole running curve creation device, and functions as the running curve input processing unit 13, the shortest time running curve creation unit 14 and the energy saving running curve creation unit 15, a ROM 22 which stores various data including a control program in a non-volatile manner, a RAM 23 which is used as a working area of the MPU 21, and temporarily stores various data, an external storage device 24 which is configured as a hard disk drive device (HDD) or the like, and functions as the ground information storage unit 11, the vehicle information storage unit 12 and the running curve creation result storage unit 16, an IC card reader/writer (R/W) 26 which is readable and writable various data to an IC memory that is a semiconductor storage device, and can function as the running curve input processing unit 13, a keyboard 27 from which an operator can input various information, and which can function as the running curve input processing unit 13, a display 28 which is configured as a liquid crystal display, an organic EL display or the like, and can function as the running curve creation result display unit 17, and a communication interface (I/F) 29 which performs an interface operation of communication via a communication network such as Internet, a LAN not shown, and can function as the running curve input processing unit 13.

Here, a format and a data example of the storage data in each of the ground information storage unit 11 and the vehicle information storage unit 12 will be described.

To begin with, a format and a data example of the ground information data stored in the ground information storage unit 11 will be described.

Figure 3:
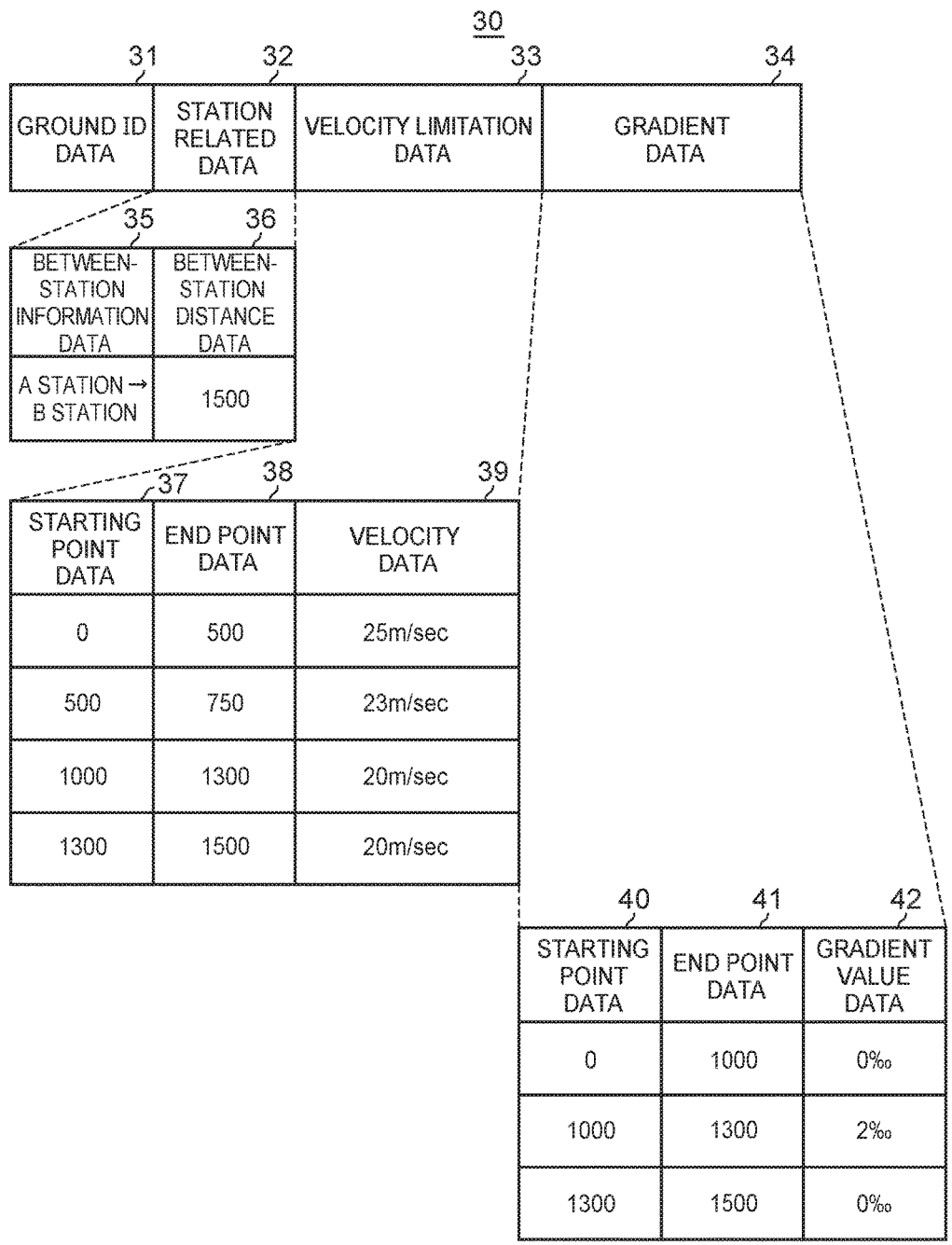
FIG. 3 is an explanation diagram of a format and a data example of the ground information data.

FIG. 3 is an explanation diagram of a format and a data example of the ground information data.

When broadly divided, ground information data 30 which is stored in the ground information storage unit 11 includes ground ID data 31 for specifying the ground information data, station related data 32 including station related information corresponding to the relevant ground information data 30, speed limitation data 33 as information relating to speed limitation between the stations corresponding to the station related data 32, and gradient data 34 as information relating to a gradient between the stations corresponding to the station related data.

The station related data 32 includes between-station information data 35 corresponding to the ground ID data 31, and between-station distance data 36 corresponding to the ground ID data 31.

More specifically, the between-station information data 35 indicates to go from A station toward B station, and the between-station distance data 36 indicates that a between-station distance in the case of going from A station toward B station is 1500 m.

With respect to a limitation of a speed between the stations specified by the station related data 32, the speed limitation data 33 includes starting point data 37 indicating a starting point of a speed limitation section where a speed limitation is imposed, end point data 38 indicating an end point of the speed limitation section, and speed data 39 indicating an upper limit speed in the relevant speed limitation section.

The starting point data 37 indicates a distance from a departure station to a starting point position of the speed limitation section, when the departure station (in the above-described case, A station) is set to 0 m.

In addition, the end point data 38 indicates a distance from the departure station to an end point position of the speed limitation section, when the departure station is set to 0 m.

In addition, an upper limit speed value in the corresponding speed limitation section is stored in the speed data 39.

Specifically, in the case of the example of FIG. 3, regarding the speed limitation section, there are four sections between A station that is the departure station and B station that is the arrival station, and a first section is a section from a position (distance 0 m) of A station that is the departure station to a position of 500 m therefrom, and the upper limit speed value is 25 m/sec.

Similarly, a second section is a section from a position of 500 m from the departure station to a position of 750 m therefrom, and the upper limit speed value is 23 m/sec. A third section is a section from a position of 1000 m from the departure station to a position of 1300 m therefrom, and the upper limit speed value is 20 m/sec. A fourth section is a section from a position of 1300 m from the departure station to a position of 1500 m (the position of B station that is the end point station) therefrom, and the upper limit speed value is 20 m/sec.

The gradient data 34 includes all gradient information from the departure station to the arrival station, and is provided with starting point data 40 indicating a starting point of a section where a gradient is continuously constant, end point data 41 indicating an end point of the section where the relevant gradient is continuously constant, and gradient value data 42 indicating a gradient value in the relevant gradient constant section.

Specifically, in the case of an example of FIG. 3, regarding the gradient constant section, there are three sections between A station and B station, and a first section is a section from a position (distance 0 m) of A station that is the departure station to a position of 1000 m therefrom, and the gradient value is 0%.

Similarly, a second section is a section from a position of 1000 m from the departure station to a position of 1300 in therefrom, and the gradient value is 2%. A third section is a section from a position of 1300 in from the departure station to a position (the position of B station that is the arrival station) of 1500 m therefrom, and the gradient value is 0%.

Next, a format and a data example of the vehicle information data stored in the vehicle information storage unit 12 will be described.

Figures 4, 5:
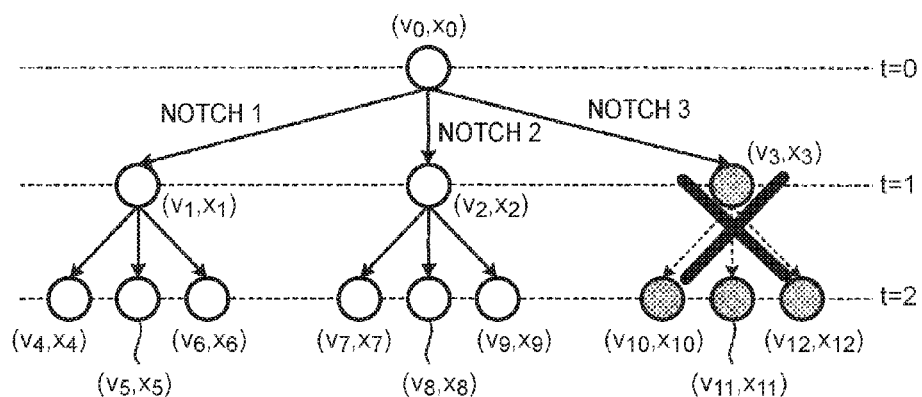
FIG. 4 is an explanation diagram of a format and a data example of the vehicle information data.
FIG. 5 is a diagram showing a creation operation and a pruning operation in a combinational optimization problem.

FIG. 4 is an explanation diagram of a format and a data example of the vehicle information data.

Vehicle information data 50 stored in the vehicle information storage unit 12 includes vehicle ID data 51 for specifying a railway vehicle, type data 52 indicating a driving type of the railway vehicle, vehicle body weight data 53 indicating a weight of a vehicle body, riding rate data 54 indicating a riding rate which is supposed at the time of creating a running curve, formation vehicle number data 55 indicating the number of the railway vehicles in a formation, train length data 56 indicating a train length, and notch characteristic ID data 57 for specifying notch characteristic of a master controller mounted on the relevant railway vehicle.

Specifically, in the case of the example of FIG. 4, the vehicle ID data 51=5, the type data 52 indicates that a driving type of the railway vehicle is a VVVF system, the vehicle body weight data 53 indicates that the vehicle body weight is 10 t, the riding rate data 54 indicates that a riding rate which is supposed at the time of creating a running curve is 50%, the formation vehicle number data 55 indicates that the number of the vehicles in a formation is 10, the train length data 56 indicates that a train length is 200 m, and the notch characteristic ID data 57 indicates that the notch characteristic ID of the master controller mounted on the relevant railway vehicle=5.

Next, prior to explaining an operation of the embodiment, a principled thinking of the embodiment will be described.

An energy saving running curve of a train has an equation of motion including a running resistance and a gradient resistance, and so on as constraints, and two-point boundary values wherein a state (initial state) at a departure station (t, v, x)=(0, 0, 0), and a state (terminal state) at an arrival station (t, v, x)=(T, 0, X), which are expressed by an elapsed time t after departure, a velocity v and a distance x from the departure station.

Here, T is an elapsed time required for a train to run from the departure station to the arrival station, and X is a distance between the departure station and the arrival station.

On the other hand, an evaluation function can be obtained by solving an optimum control problem for a total sum E (cumulative energy consumption) of energy which is consumed between a departure station and an arrival station. At this time, a control variable to designate a motion of a train becomes a notch to designate acceleration, deceleration. A train which is spreading widely at present realizes acceleration and deceleration of the train by a plurality of notches, and a running curve can be regarded as a multistage decision-making problem as to which notch is to be selected for operation at each time.

By the way, a matter which generally becomes a problem at the time of solving a multistage decision-making problem is a combinational explosion of solution candidates.

Hereinafter, the combinational explosion will be described briefly.

For example, there are ten choices of a notch, and when a running curve in a running time 100 seconds is created while a minimum control time unit is set to 1 second, a solution to satisfy the constraint has to be found from solution candidates of $10^{100}$. It is impossible to find a solution to satisfy the constraint one by one from these within a realistic time range.

Accordingly, as a method to solve a problem of this combinational explosion, a searching method of an optimum solution using dynamic programming has been proposed.

Creation of a running curve using dynamic programming is a method in which a state of (time, velocity, position) of a train is defined on a lattice point, and which searches a route of the lattice points in which the cumulative energy consumption becomes the smallest. At this time, when a plurality of routes to reach a certain state (t, v, x) exist, only a route in which the cumulative energy consumption is the smallest is stored, and the search is continued. When dynamic programming is used, a state space is previously divided in a lattice manner, but generally, it rarely occurs to move from a lattice point to another lattice point. For the reason, when it is not on a lattice point, any correction is made, and thereby it is assumed to have moved to a lattice point. In this method, when corrections to a lattice point increase, there is a problem that an error increases compared with an optimum solution.

Accordingly, in the present embodiment, a method is proposed which does not list up the whole of solution candidates of a multistage decision-making problem, but while checking (pruning) whether to be cable of becoming a candidate for a feasible solution at each stage (time), generates a solution candidate each time the stage is advanced.

Here, pruning is a general-purpose method for solving a combinational optimization problem which is known in the field of operations research. That is a method which generates a solution candidate in a generation operation, prunes a solution candidate incapable of becoming an optimum solution, and deletes such a solution candidate from a list of solution candidates. An optimum solution is searched, while repeating the generation operation and the pruning operation. This method is thinking similar to total enumeration, but it is more effective than the total enumeration method in that searching is not performed for one incapable of becoming a solution candidate.

FIG. 5 is a diagram showing a generation operation and a pruning operation in the combinational optimization problem.

Specifically, when a state is a velocity V0, a position X0, at an elapsed time t=0, regarding the conceivable state, at an elapsed time t=1 after a minimum control time unit has elapsed, a first state is a velocity V1, a position X1, a second state is a velocity V2, a position X2, a third state is a velocity V3, a position X3, but when evaluation of the relevant third state or three states (velocity V10, position X10), (velocity V11, position X11), (velocity V12, position X12) at an elapsed time t=2 which have transited from the relevant third state is performed, when an evaluation value required for making transition cannot be obtained (when improbable as a solution candidate), pruning is performed and the following search is not performed. However, since a pruning operation changes depending on a problem to be solved, it has to be properly set according to the problem.

Hereinafter, a specific operation including a generation operation and a pruning operation will be described.

Figure 6:
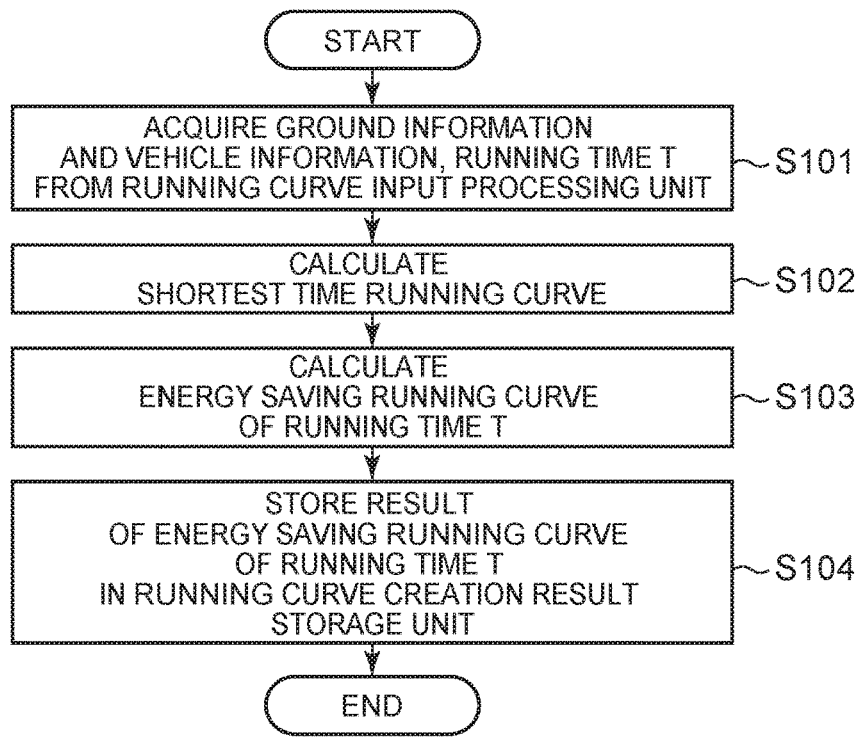
FIG. 6 is a processing flow chart of an embodiment.

FIG. 6 is a processing flow chart of the embodiment.

To begin with, the ground information, the vehicle information and a running time T are acquired from the running curve input processing unit 13 (step S101).

That is, when creating a running curve, it is necessary to input what between-station of a route (it is necessary to discriminate a case to advance from A station to B station, and a case to advance from B station to A station), by what vehicle, and in what running time T, a train is made to run.

Here, regarding inputting of various data such as the vehicle information, the between-station information, the running time, it is thought that a setting file stored in an IC card 25 is read by the IC card R/W 26, or the data is inputted from a setting file received via the communication I/F 29, or the data is directly inputted via a keyboard 27 or the like.

When the various data such as the vehicle information, the between-station information, the running time information is inputted to the running curve input processing unit 13, the running curve input processing unit 13 acquires data necessary for creating a running curve, with reference to the ground information storage unit 11 and the vehicle information storage unit 12, and based on the inputted vehicle information and between-station information.

Subsequently, the MPU 21 functioning as the shortest time running curve creation unit 14 receives data necessary for creating a running curve from the running curve input processing unit 13, and creates a running curve of a shortest time between the inputted stations (step S102).

Figure 7:
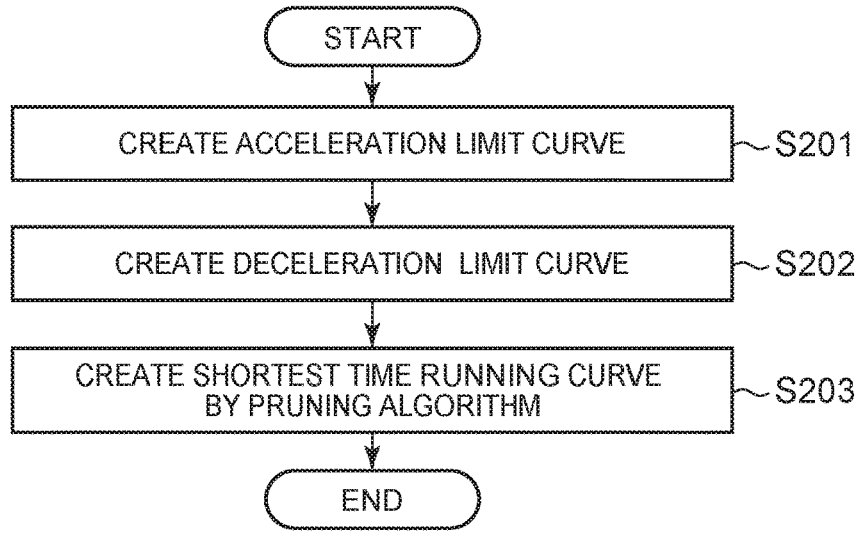
FIG. 7 is a creation processing flow chart of a shortest time running curve.

FIG. 7 is a creation processing flow chart of a shortest time running curve.

When roughly classified, the creation processing of a shortest time running curve is configured to be provided with a creation processing of an acceleration limit curve (step S201), a creation processing of a deceleration limit curve (step S202) and a creation processing of a shortest time running curve by a pruning algorithm (step S203).

Hereinafter, this will be specifically described.

In order to create a shortest time running curve, it is necessary to obtain a solution of a shortest time control having an initial condition and a terminal condition. Generally, the shortest time control is controlled by a maximum acceleration or a maximum deceleration, that is called bang-bang control. However, since a speed limitation mainly by a position is applied at the time of operating a train, a train is not necessarily be controlled by only a maximum acceleration and a maximum deceleration. Accordingly, a range in which a train can be moved by a maximum acceleration or a maximum deceleration is obtained.

Figure 8:
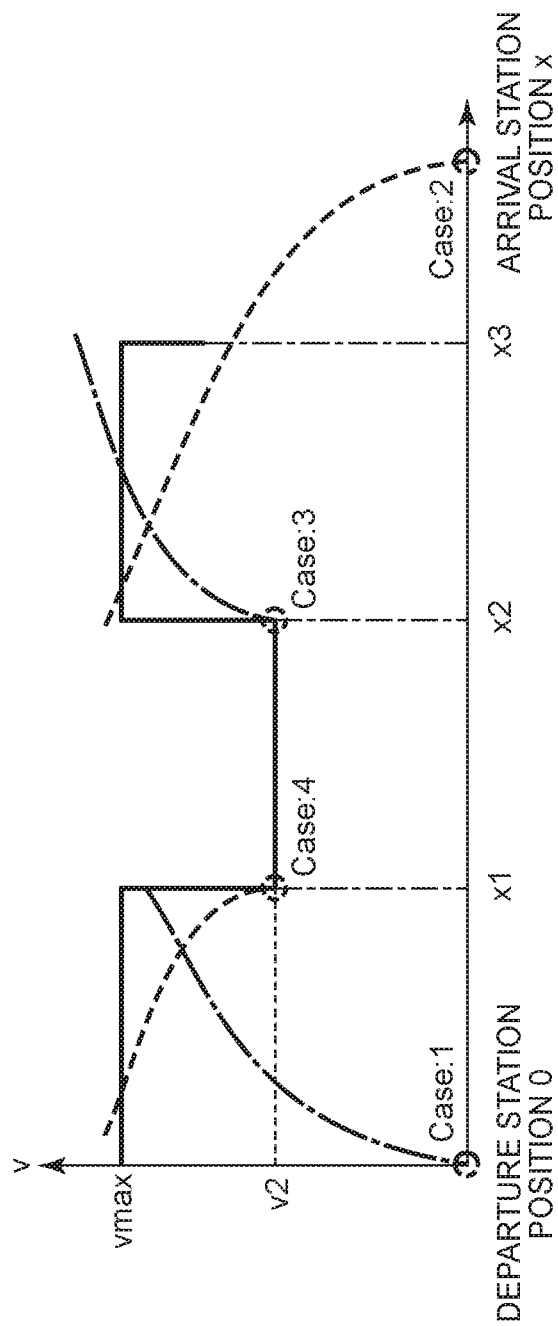
FIG. 8 is an explanation diagram of a usable condition of a maximum acceleration and a maximum deceleration.

FIG. 8 is an explanation diagram of a usable condition of a maximum acceleration and a maximum deceleration.

Cases in which a maximum acceleration and a maximum deceleration can be used at the time of operating a train are four cases of case 1-case 4, as shown in FIG. 8.

Case 1: to use a maximum acceleration when departing from a departure station

Case 2: to use a maximum deceleration when arriving at an arrival station

Case 3: to use a maximum acceleration when a speed increases in the traveling direction Case 4: to use a maximum deceleration when a speed limit decreases in the traveling direction In FIG. 8, a right upward line shows a case in which a train is moved at a maximum acceleration, and a right downward line shows a case in which a train is moved at a maximum deceleration.

Only one state of Case 1 and only one state of Case 2 inevitably exist in one between-station.

In contrast, since there is a possibility that a plurality of states of Case 3 and a plurality of states of Case 4 exist in one between-station, it is necessary to calculate an acceleration limit curve and a deceleration limit curve for the whole of them.

Firstly, a variable ST shown in FIG. 9 and FIG. 10 will be described using FIG. 8.

To begin with, it is assumed that a velocity limitation is given by a following struct array.

```
struct velocity_limitation {
    double position; // starting position of velocity
limitation
    double velocity; // velocity limit after the above-
described starting positon
};
In Fig. 8,
struct velocity_limitation ST[3]
= {{0, vmax}, {x1, v2}, {x2, vmax}};
```

Here, it is assumed that the smaller an index of the struct is, the smaller the starting position becomes, such as ST[0].position<ST[1].position<ST[2].position<ST[3].position.

Next, positions to become targets of an acceleration limit curve and a deceleration limit curve are detected.

The followings are set by default.

a target position of the acceleration limit curve=0; // Case 1 a target velocity of the acceleration limit curve=0; // Case 1 a target position of the deceleration limit curve=x; // Case 2 (a distance from the departure station to the arrival station)

a target velocity of the deceleration limit curve=0; // Case: 2

Regarding others, positions which coincide with the following conditions are set as target positions of the acceleration limit curve and the deceleration limit curve.

```
for (int i = 1; i < sizeof(ST)/sizeof(ST[0]); i++)
{
    if (ST[i-1].velocity < ST[i].velocity) {
        a target position of the acceleration limit curve =
ST[i].position; // Case3
        a target velocity of the acceleration limit curve = ST[i-
1].velocity; // Case3
    } else {
        a target position of the deceleration limit curve =
ST[i].position; // Case4
        a target velocity of the deceleration limit curve =
ST[i].velocity; // Case3
    }
}
```

Figure 9:
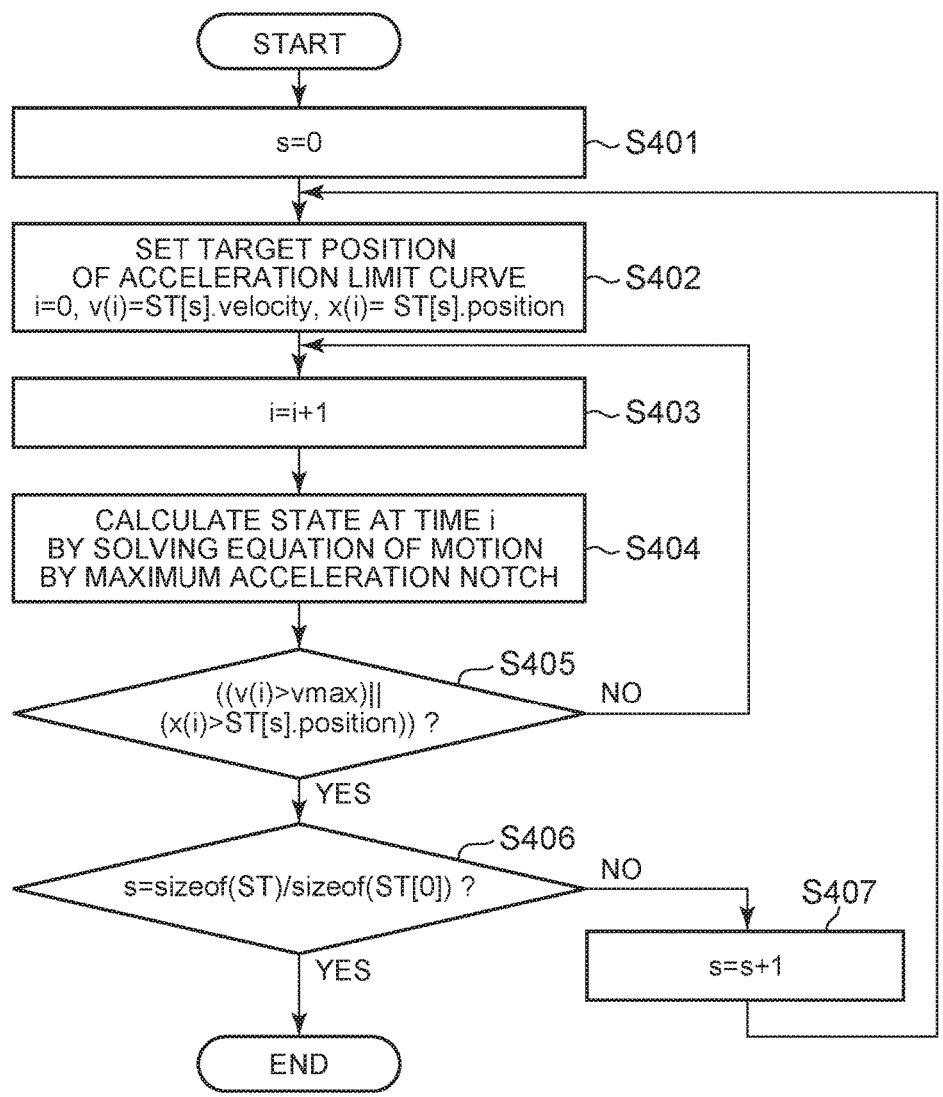
FIG. 9 is a processing flow chart of a creation processing of an acceleration limit curve.

In FIG. 9, regarding the target positions and the target velocities necessary for creating an acceleration limit curve, all target positions and target velocities which satisfy the above-described conditions in Case 1 at the time point of departing from a station of default, and in cases in which a plurality of velocity limitations exist, are set in the array ST.

Figure 10:
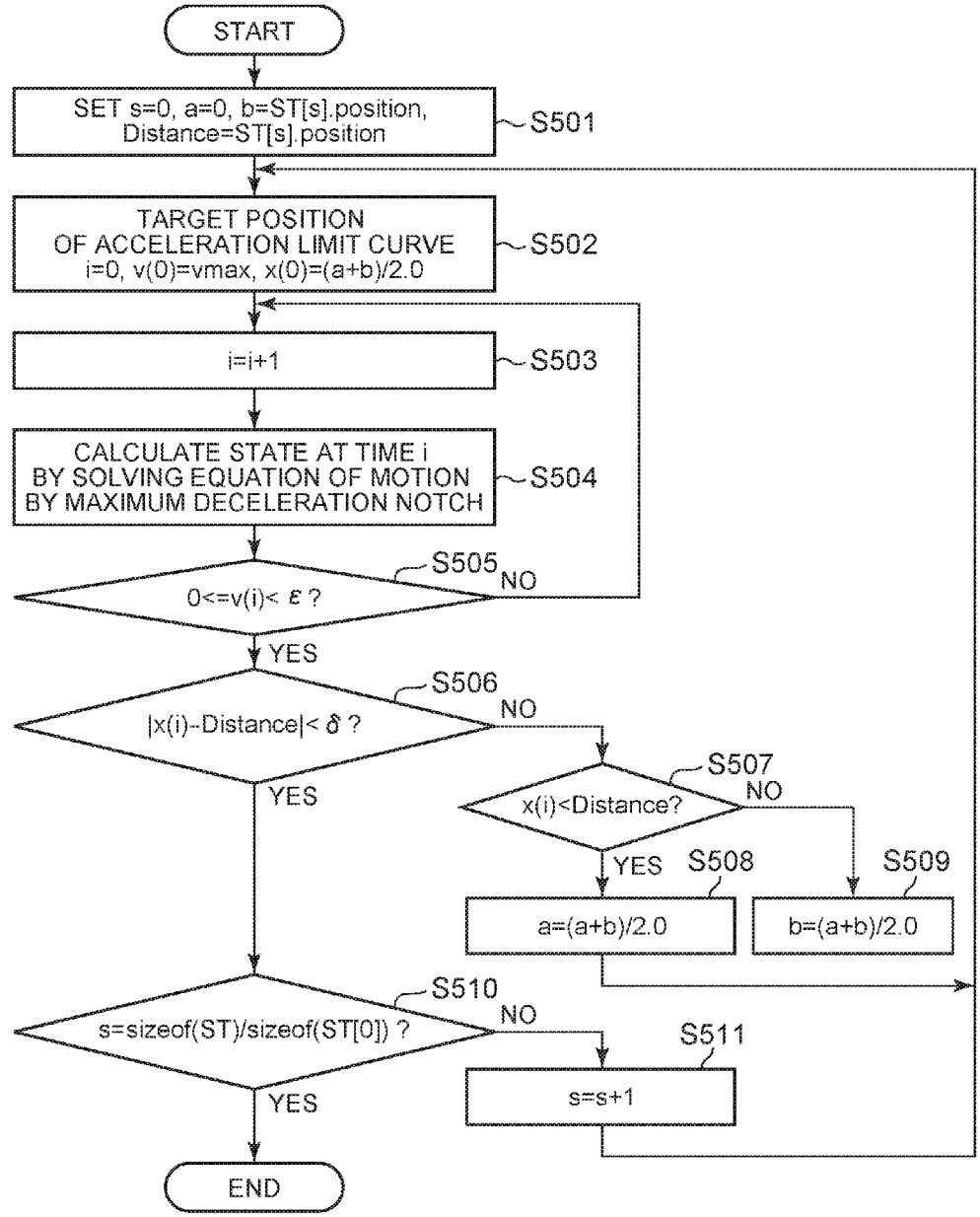
FIG. 10 is a processing flow chart of a creation processing of a deceleration limit curve.

Similarly, in FIG. 10, regarding the target positions and the target velocities necessary for creating a deceleration limit curve, all target positions and target velocities which satisfy the above-described conditions in Case: 2 at the time point of arriving at a station of default, and in cases in which a plurality of velocity limitations exist, are set in the array ST.

Specifically, FIG. 8 is taken as an example,
in the case of the acceleration limit curve,
struct velocity_limitation ST[2]={{0, 0}, {x2, v2}};
and in the case of the deceleration limit curve,
struct velocity_limitation ST[2]={{x1, v2}, {X, 0}};
In the acceleration limit curve creation processing (step S201), to begin with, (velocity, position) is calculated when the maximum acceleration and the maximum deceleration are used.

Each curve in the case 1-the case 4 shown in FIG. 8 shall be called an acceleration limit curve or a deceleration limit curve.

By the way, the acceleration limit curve can easily be obtained by giving an initial condition of a velocity and a position of a case to use a maximum acceleration.

FIG. 9 is a processing flow chart of a creation processing of an acceleration limit curve.

To begin with, a variable s is initialized, and is set to 0 of an initial value (step S401).

Next, a target position of the acceleration limit curve, that is, an acceleration elapsed time i=0, an initial velocity in the acceleration limit curve v(0)=ST[s].velocity and an initial position x(0)=ST[s].position are set (step S402).

Next, 1 is added to the time i (step S403).

Subsequently, a state (v(i), x(i)) at the time i is calculated by solving the equation of motion by a maximum acceleration notch (corresponding to a notch position capable of obtaining a maximum acceleration) (step S404).

Next, whether the velocity v(i) at the time i has exceeded a velocity limit vmax, that is v(i)>vmax, or whether or not the position x(i) at the time i has exceeded the target position ST[s].position is discriminated (step S405).

In the discrimination of the step S405, when the velocity v(i) at the time i does not exceed the velocity limit vmax, and the position x(i) at the time i does not exceed the target position ST[s].position (step S405; No), the processing is transferred to the step S403 again, and then the similar processing is repeated.

In the discrimination of the step S405, when the velocity v(i) at the time i exceeds the velocity limit vmax, or the position x(i) at the time i exceeds the target position ST[s].position (step S405; Yes), whether or not the target position of the acceleration limit curve is reached is discriminated, that is, whether or not $$s=\text{sizeof}(ST[s])/\text{sizeof}(ST[0])$$

is discriminated (step S406).

In the discrimination of the step S406, when the target position of the acceleration limit curve is not reached (step S406; No), 1 is added to the variable s (step S407), and the processing is transferred to the step S402 again, and then the similar processing is repeated.

In the discrimination of the step S406, when the target position of the acceleration limit curve is reached (step S406; Yes), the creation processing of the acceleration limit curve is finished.

Next, the deceleration limit curve is calculated in the same manner as the calculation of the acceleration limit curve (step S202).

In the present embodiment, in the case of the deceleration limit curve, an initial condition which satisfies a terminal condition is searched with an iteration method. Generally, since it is almost impossible to accurately coincide with a terminal condition, allowable ranges ($\varepsilon$ and $\delta$) are given to a terminal condition, and an initial condition to satisfy the range is obtained.

FIG. 10 is a processing flow chart of a creation processing of a deceleration limit curve.

To begin with, the variable s is initialized and is set to 0 of an initial value, a variable a is initialized and is set to 0 of an initial value, and a variable b=ST[s].position, a variable Distance=ST[s].position (step S501).

Next, a target position of the deceleration limit curve, that is, a deceleration elapsed time i=0, an initial velocity in the deceleration limit curve v(0)=vmax and an initial position x(0)=(a+b)/2.0 are set (step S502).

Next, 1 is added to the time i (step S503).

And, a state of the train at the time i is calculated by solving the equation of motion by a maximum deceleration notch (step S504).

Subsequently, whether or not the velocity v(i) at the time i satisfies the following equation corresponding to the allowable value $\varepsilon$ (step S505).

$$0 \le v(i) < \varepsilon$$

In the discrimination of the step S505, when $\varepsilon \le v(i)$ (step S505; No), the processing is transferred to the step S503 again, and then, the similar processing is performed.

In the discrimination of the step S505, when $0 \le v(i) < \varepsilon$ (step S505; Yes), whether or not the position x(i) at the time i satisfies the following equation corresponding to the allowable value $\delta$ (step S506).

$$|x(i)-\text{Distance}| < \delta.$$

In the discrimination of the step S506, when $|x(i)-\text{Distance}| \ge \delta$ (step S506; No), whether or not x(i)<Distance is discriminated (step S507).

In the discrimination of the step S507, when x(i)<Distance (step S507; Yes), a=(a+b)/2.0, and the processing is transferred to the step S502 again, and then, the similar processing is performed (step S508).

In the discrimination of the step S507, when x(i)≥Distance (step S507; No), b=(a+b)/2.0, and the processing is transferred to the step S502 again, and then, the similar processing is performed (step S509).

On the other hand, in the discrimination of the step S506, when $|x(i)-\text{Distance}| < \delta$ (step S506; Yes), whether or not the target position of the deceleration limit curve has been reached is discriminated, that is, whether or not s=sizeof(ST[s])/sizeof(ST[0]) is discriminated (step S510).

In the discrimination of the step S510, when the target position of the deceleration limit curve has not been reached (step S510; No), 1 is added to the variable s (step S511), and the processing is transferred to the step S502 again, and then, the similar processing is repeated.

In the discrimination of the step S510, when the target position of the deceleration limit curve has been reached (step S510; Yes), the creation processing of the deceleration limit curve is finished.

By the way, in order to calculate a deceleration limit curve, a reverse method in which an equation of motion is solved while advancing a time backward is used sometimes, but when a gradient exists, a solution by the reverse method sometimes deviates from a solution by a general numerical solution method of a differential equation in which the equation is solved while advancing a time forward.

In contrast, according to the method of the present embodiment, a method for solving a differential equation more accurately is used, and thereby, compared with a reverse method, a deceleration limit curve with more accuracy can be obtained.

Next, a shortest time running curve is created based on a pruning algorithm (step S203).

Figure 11:
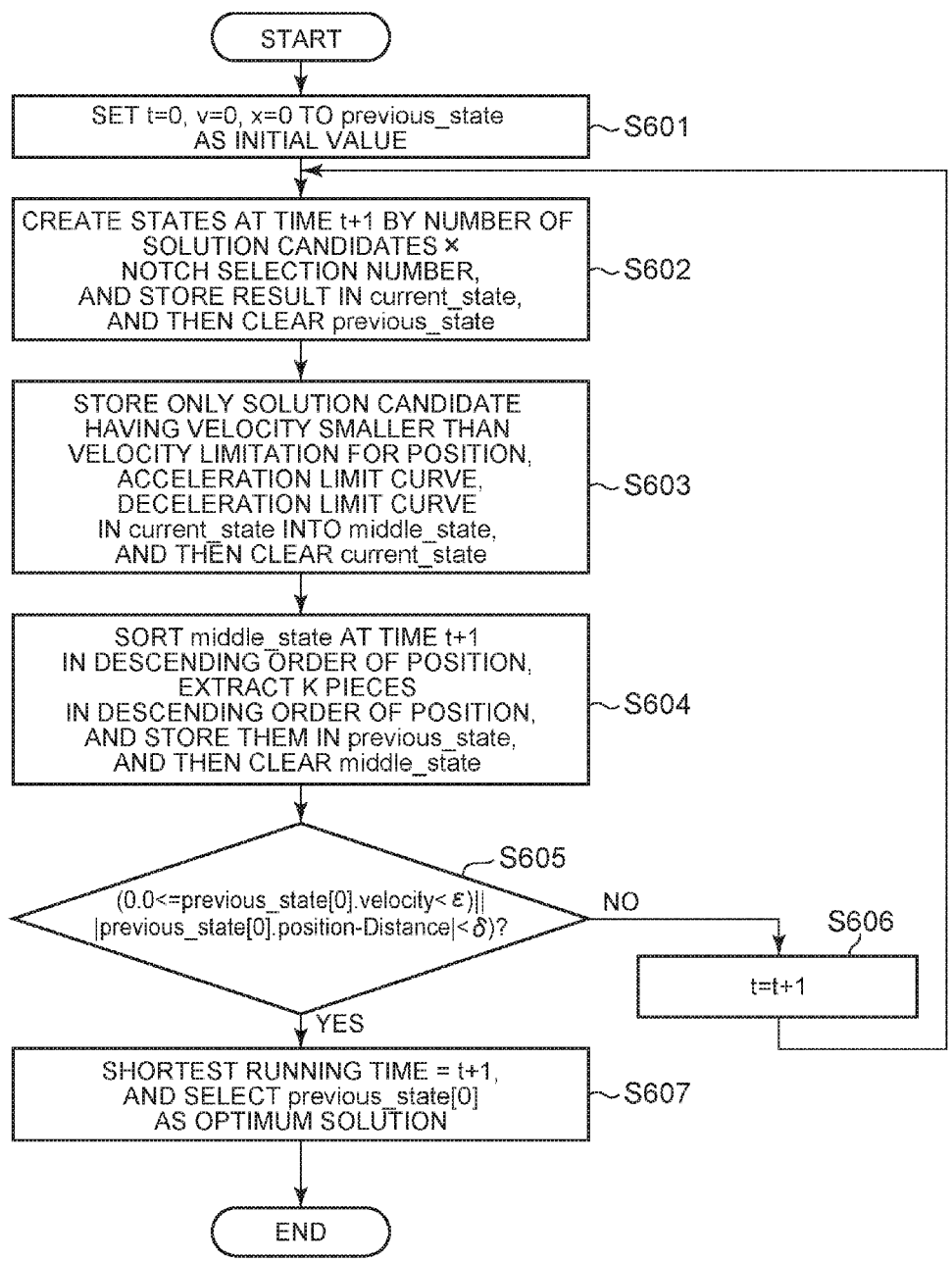
FIG. 11 is a processing flow chart of a creation processing of a shortest time running curve.

FIG. 11 is a processing flow chart of a creation processing of a shortest time running curve.

Here, a variable previous_state, a variable current_state and a variable middle_state which are shown in FIG. 11 will be described.

In the present embodiment, a control program which has been developed with a high-level language such as C++ and JAVA (registered trademark) is supposed, as a control program to realize a running curve creation processing.

Particularly, in C++ and JAVA, it is possible to use a variable length array in which a size of an array can be varied depending on the number of elements. For this reason, in the present embodiment, a solution candidate at each time shall be expressed using a variable length array.

Specifically, a solution candidate is expressed in C++ or the like by a struct such as

```
struct phase {
    double position; // position
    double velocity; // velocity
    double energy; // instantaneous energy consumption
    double total_energy; // cumulative energy consumption
    int notch[500]; // a notch number at each time
    int change_count; // the number of times of notch changeover
    int notch_continuous_time; // a continuous time of the present notch};.
```

And, by making
vector<struct phase>previous_state;
vector<struct phase>current_state;
vector<struct phase>middle_state;
a solution candidate should be expressed.

To begin with, the elapsed time t=0, the velocity v=0, the position x=0 are set to the variable previous_state, as an initial condition of the departure station, (step S601).

Next, the equations of motion (differential equation) in the whole notches are solved, for each of the solution candidates at the elapsed time t+1, and thereby solution candidates at the elapsed time t are created by the number of (the number of solution candidates at the elapsed time t) X (notch selection number), and the solution candidates are stored as the variable current_state, and the variable previous_state is released (cleared) from the memory (step S602).

Here, a method of creating a solution candidate at the elapsed time t+1 will be specifically described.

To begin with, it is assumed that N solution candidates exist at the elapsed time t.

When a state of an n-th solution candidate in N solution candidates is described as (t, $v_n(t)$, $x_n(t)$), a state at the elapsed time t+1 is calculated by numerical calculation such as a quartic Runge-Kutta method, using an acceleration or a deceleration given by a k-th notch NOTCH(k), by setting the n-th state (t, $v_n(t)$, $x_n(t)$) as an initial value on numerical calculation. Here, a quartic Runge-Kutta method has been listed as the numerical calculation example, but a numerical solution method of an equation of motion is not limited to this.

By this means, solution candidates at the elapsed time t+1 are generated by NK pieces.

Subsequently, regarding a velocity of each of the solution candidates of the variable current_state, whether the velocity is a value smaller than the acceleration limit curve, the deceleration limit curve and a velocity limitation by the position is checked, and only those having a smaller velocity are stored in the variable middle_state, and the variable current-state is released (cleared) from the memory (step S603).

The variable middle_state is sorted in descending order (in order from a larger one) of the position, and the high order K pieces thereof are stored in the variable previou_state, and the variable middle_state is released from the memory (step S604).

Here, the higher order K pieces are left, because of preventing the solution candidates from becoming nonexistent. The larger the value of K is, the lower the possibility that the solution candidate becomes nonexistent is. However, if the value of K becomes too large, since the calculation time becomes larger, and thereby it is thought that practically K=about 20 is proper.

Accordingly, in the following description, consideration will be made assuming that K=20.

Further, the processing is repeated until the condition in which the terminal condition has an allowable width is satisfied (step S605; Yes), in the same manner as the deceleration limit curve, and t+1 is set to a shortest running time, for the elapsed time t when a solution candidate to satisfy the condition is found (step S607).

In the discrimination of the step S605, when the condition is not satisfied (step S605; No), 1 is added to the elapsed time t (incremented) (step S606), and the processing is transferred to the step S602 again, and then the similar processing is repeated.

Next, a creation processing of an energy saving running curve will be described.

Figure 12:
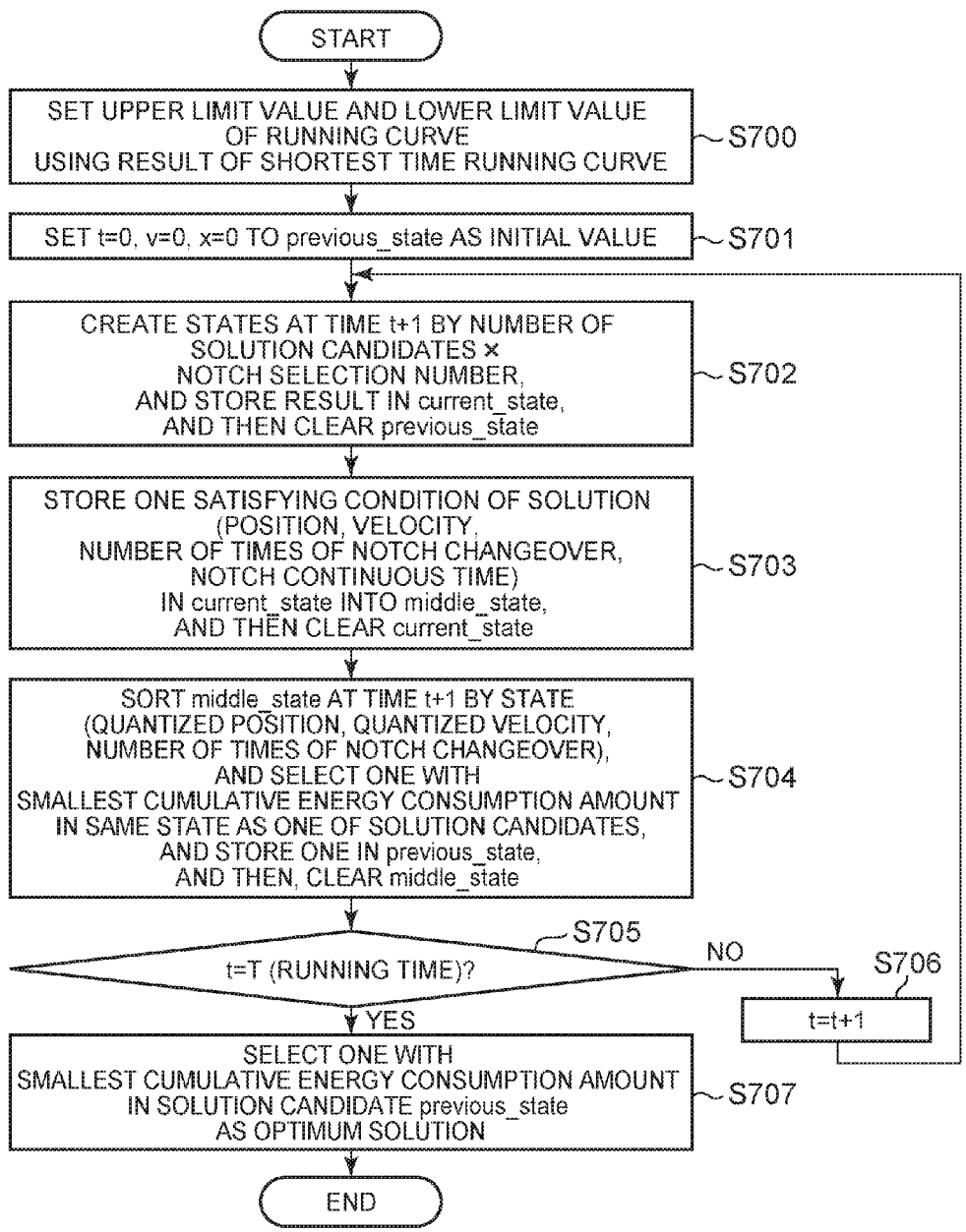
FIG. 12 is a processing flow chart of a creation processing of an energy saving running curve.

FIG. 12 is a processing flow chart of a creation processing of an energy saving running curve.

To begin with, in order to create an energy saving running curve in the running time T which is inputted by the running curve input processing unit 13, the result of the shortest time running curve creation unit 14 is acquired, and the result of the shortest time running curve is set as an upper limit value, and one which is obtained by moving the result of the shortest time running curve in the time direction by the running time T is set as a lower limit value (step S700).

To begin with, as an initial condition of a departure station, the elapsed time t=0, the velocity v=0, the position x=0 are set to the variable previous_state (step S701).

Next, the equations of motion (differential equation) in the whole notches are solved, for each of the solution candidates at the elapsed time t+1, and thereby solution candidates at the elapsed time t are created by the number of (the number of solution candidates at the elapsed time t) X (notch selection number), and the solution candidates are stored as the variable current_state, and the variable previous_state is released (cleared) from the memory (step S702).

Subsequently, those satisfying a condition of a solution (position, velocity, number of times of notch changeover, notch continuous time), in the variable current_state are stored in the variable middle_state, and the variable current_state is released (cleared) from the memory (step S703).

The variable middle_state at the elapsed time t+1 is sorted by a state (quantized position, quantized velocity, number of times of notch changeover). And one with the smallest cumulative energy consumption amount among the states which are assumed to be the same state is selected as one of solution candidates, and is stored in the variable previous_state, and then the variable middle_state is released from the memory (step S704).

Next, whether or not the elapsed time t=the running time T is discriminated (step S705).

In the discrimination of the step S705, when the elapsed time t<the running time T yet (step S705; No), 1 is added to the elapsed time t (is incremented), and the processing is transferred to the step S702 again, and then the similar processing is repeated.

In the discrimination of the step S705, when the elapsed time t=the running time T (step S705; Yes), one with the smallest cumulative energy consumption amount out of the solution candidates stored in the variable previous_state is selected as an optimum solution (step S707).

Next, a condition for checking a solution candidate will be described in detail.

For simplification, here it will be described to calculate a running curve in the case that a train has run between certain stations in a running time $T_{min}+10$, as an example. Here, the shortest running time $T_{min}$ is a running time (shortest running time) when a train has run between the stations in a shortest time.

It is assumed that a train runs between the stations in a running time $T_{min}+10$ which is 10 seconds longer than the shortest running time $T_{min}$.

Figure 13:
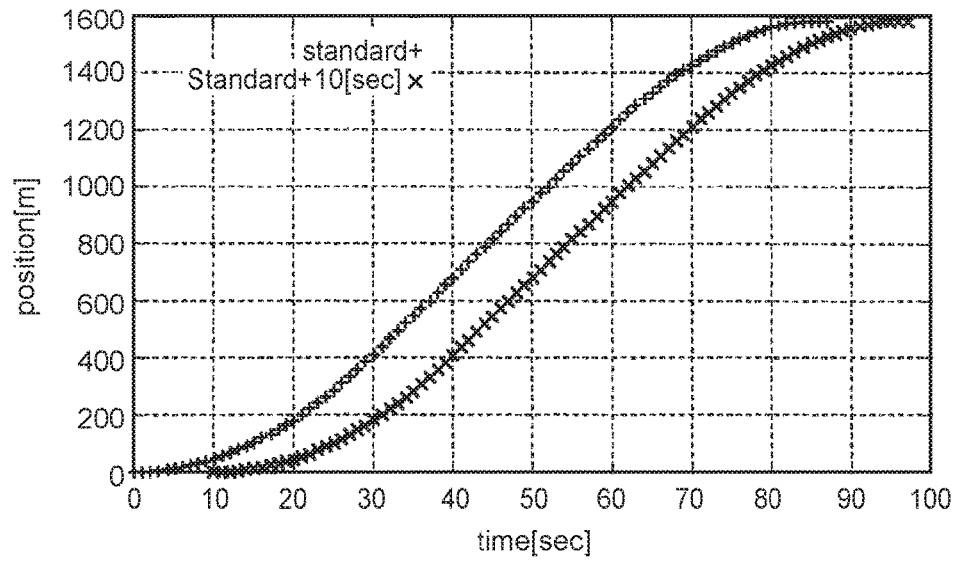
FIG. 13 is an (x-t) graph wherein a time is taken on a horizontal axis and a position of a train is taken on a vertical axis.

FIG. 13 is an (x–t) graph wherein a time is taken on a horizontal axis and a position of a train is taken on a vertical axis.

An upper graph indicates the relation of the position x and the elapsed time t in the case of running in the shortest running time $T_{min}$, and a lower graph indicates the relation of the position x and the elapsed time t in the case of running in the shortest running time $T_{min}$, after waiting 10 seconds at a departure station.

Here, the shortest running time $T_{min}$ is a time in the case that a train is made to run by making the most of the performance of a vehicle, and if the performances of vehicles are the same, it indicates that a train cannot run faster than that time.

That is, when the performance of a vehicle is determined, the shortest running time $T_{min}$ can be obtained uniquely.

Accordingly, when the position x is closer to the departure station than the lower graph, it is indicated that a train cannot arrive at the arrival station (next station) in the running time $T_{min}+10$.

Accordingly, the following can be said.

When a train runs between certain stations in the running time $T_{min}+10$, a position at the elapsed time t in the case that the train runs in the shortest running time $T_{min}$ between the stations is made Upper[t], and a graph which is obtained by moving a graph (t, Upper[t]) in the shortest running time $T_{min}$ in parallel in the time axis direction by 10 seconds is made (t, Lower[t]). In this regard, it is assumed that when t<10, Lower[t]=0.

When an orbit of a solution in which the energy consumption amount in the running time $T_{min}+10$ becomes minimum is made (t, v(t), x(t)), $$\text{Lower}[t] \leq x(t) \leq \text{Upper}[t]$$

is established.

Here, t is 0, 1, 2, ..., $T_{min}+10$.

Figure 14:
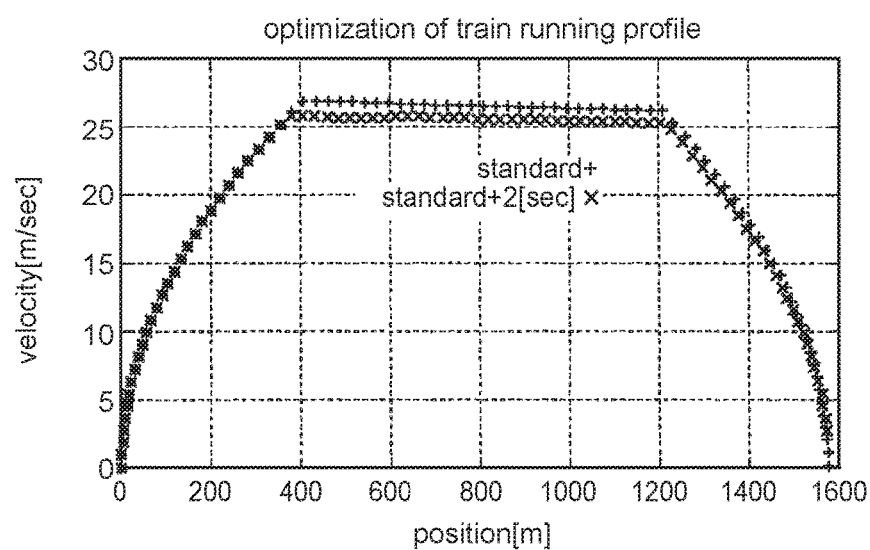
FIG. 14 is an explanation diagram of a velocity condition.

FIG. 14 is an explanation diagram of a velocity condition.

Generally, in the railway business world, this graph is called a running curve. Here, in the (v–x) graph, a velocity V at the position x corresponding to the running time T is written as $V_T[x]$. Then, it is known that the following characteristic exists, from the result of prior research.

$$0 \leq V_T[x] \leq V_{Tmin}[x]$$

Here, $0 \leq x \leq X$

That is, when seen in the graph (v–x), the running curve of the running time T exists inside the shortest time running curve.

However, regarding a result of the shortest time running curve, only a velocity and a position of the train at a discrete elapsed time t are known, and it is difficult to calculate such result in the same manner as $V_{Tmin}[x]$.

Accordingly, the following equation will be used, in place of the above-described relational expression between $V_T[x]$ and $V_{Tmin}[x]$. To begin with, a velocity and a position at the elapsed time t for an optimum running curve of the running time $T_{min}$, are respectively made $V_{Tmin}(t)$, $X_{Tmin}(t)$. α (natural number) which satisfies $X_{Tmin}(\alpha-1) \leq x(t) < X_{Tmin}(\alpha)$ is to be found, for a solution candidate (t, v(t), x(t)) at the elapsed time t. Whether or not the following equation holds is determined for the found α.

$$0 \leq v(t) \leq \frac{V_{T_{\min}}(\alpha) - V_{T_{\min}}(\alpha-1)}{X_{T_{\min}}(\alpha) - X_{T_{\min}}(\alpha-1)} \times (x(t) - X_{T_{\min}}(\alpha-1)) + V_{T_{\min}}(\alpha-1) \quad \text{[Number 1]}$$

This is obtained by approximating $V_{Tmin}(x)$ with linear interpolation, using a result of the running time Tmin which gives an upper limit of a velocity by a position.

By the way, when a running curve is simply obtained by the above-described method, since a running curve wherein the cumulative energy consumption amount is small is to be generated, a running curve which is highly operable to a driver is not always generated.

For example, in order to operate a vehicle according to the running curve to be generated, there is a possibility that the notch is to be operated finely at each time, and accordingly, this method may be probably not practical.

Therefore, in the present embodiment, the number of times of notch changeover until that time is counted, as a selection condition for a solution candidate, and if one has the number not less than a definite value, the one is excluded from the solution candidate. For example, when the number of times of notch changeover for running between certain stations until a train arrives at a next station is set to not more than 10 times, only a variable current_state[i] satisfying a condition that a variable storing the number of times of notch changeover current_state[i].change_count≤10 is stored in the variable middle_state.

In addition, a notch continuous condition is a condition so as not to changeover the notch at a short time interval, in the same manner as the number of times of notch changeover. When the notch continuous condition is set to not less than 5 seconds, only the variable current_state[i] which satisfies a condition that a variable storing the notch continuous time current_state[i].notch_contiuous_time≤5 is stored in the variable middle_state.

For this reason, in the above-described step S703, determination is made to the whole solution candidates, using the position condition, the velocity condition, the condition of the number of times of notch changeover, the notch continuous time condition, and thereby only those which satisfy these conditions are stored in the variable middle_state.

Further, in the step S704, the state (t, v(t), x(t)) at the elapsed time t+1, in the variable middle_state in which the solution candidates satisfying the respective conditions are stored in the step S703, is quantized with respect to the velocity and the position, and those having the quantized velocity and position, the number of times of notch changeover, the notch continuous time which are the same are grouped, and only one having the smallest cumulative energy consumption amount out of those grouped has been left as a solution candidate.

In addition, in the present embodiment, such an extension as to select the notch so as not to exceed an upper limit value regarding an instantaneous energy consumption amount can easily be made.

Here, a quantization processing will be described in more detail.

Figure 15:
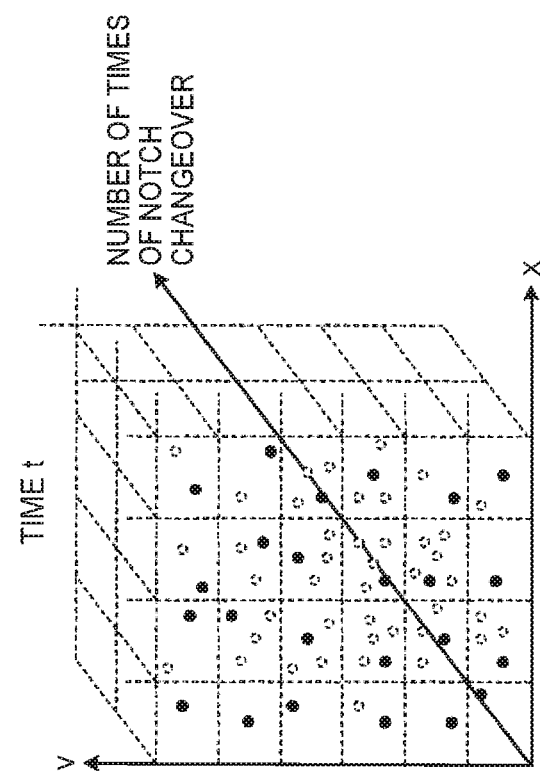
FIG. 15 is an explanation diagram of a quantization processing.
Figure 15:
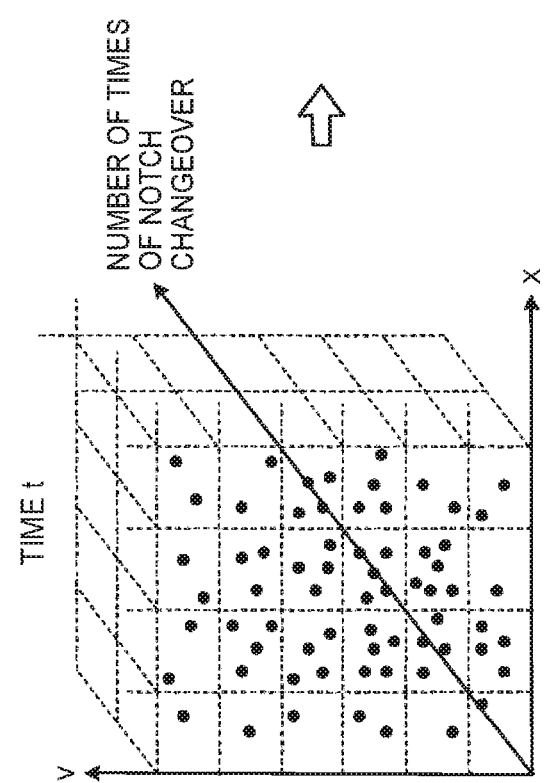

FIG. 15 is an explanation diagram of a quantization processing.

Since a position and a velocity are continuous values, in order to quantize them, the values thereof are quantized by a definite width, such as, 1 [m] regarding the position, and 0.1 [m/sec] regarding the velocity, for example, and regarding the position, since the upper limit value Upper[t] and the lower limit value Lower[t] at the time t are determined, there is a method to quantize a position by dividing the position between Upper[t] and Lower[t] by N. Here, the following description will be made as a premise that each of a position and a velocity is quantized by a definite width.

In the present embodiment, since the four conditions of the position condition, the velocity condition, the condition of the number of times of notch changeover, the notch continuous time condition are used, the state of a solution candidate is defined by four axes, but since a state in not less than four dimensions is hard to be exemplified, here, the description will be made using the three conditions of the position condition, the velocity condition, the condition of the number of times of notch changeover.

It is assumed that a result that solution candidates at a certain elapsed time t have been subjected to a pruning operation is in a state as shown in FIG. 15(a).

The quantization processing divides a (v(t), x(t), n(t)) space into a lattice state (rectangular state) as shown in FIG. 15(a), and the inside of the same region is assumed to be in the same state (condition). Here, n(t) is a number of times of notch changeover at the elapsed time t.

And, if a plurality of solution candidates exist in the same region, one having the smallest cumulative energy consumption amount in the same region is left as a solution candidate. As a result, it becomes possible to prune more solution candidates, and thereby a processing time can be more shortened.

In FIG. 15(b), a black dot indicates one which has remained as a solution candidate in each region.

In the step S705, whether the elapsed time t coincides with the running time T is determined, and if they are not coincident (step S705; No), the processing proceeds to a step S706, the elapsed time t is incremented, and the processing is transferred to the step S702 again.

In the step S705, if the elapsed time t coincides with the running time T (step S705; Yes), one with the smallest cumulative energy consumption amount is selected out of the solution candidates as an optimum solution (step S707).

And in the processing of the step S707, in order to finally select one having the small cumulative energy consumption amount, the solution candidates are sorted in ascending order (in order from a smaller one) regarding the cumulative energy consumption amount, and the one should be selected from them based on the sorting result.

In addition, when a plurality of solution candidates exist at the end time point, one wherein the cumulative energy consumption amount+penalty(v, x) is the smallest is made an optimum solution.

Here, penalty(v(T), x(T)) indicates a penalty of an error between the state (T, v(T), x(T)) at the elapsed time t and the terminal state (T, 0, X). Generally, when a velocity and a position are calculated in an equation of motion, since a variable of a floating point type is used, the velocity and the position do not completely coincide with the terminal state in many cases. For the reason, the function penalty(v(T), x(T)) is prepared, and the cumulative energy consumption amount including errors is evaluated.

Regarding a method of determining penalty(v(T), x(T)), the following equation is adopted in the same manner as Non-Patent Document 6

$$\text{penalty}(v(T),x(T))=\{v(T)\}^2+\{x(T)-X\}^2 \quad \text{[Number 2]}$$

Next, a data format of the storage data of the running curve creation result storage unit 16 will be described.

FIG. 16 is an explanation diagram of a format and a data example of the storage data of the running curve creation result storage unit.

In the running curve creation result storage unit 16, data as shown in FIG. 16 is stored for each combination of the vehicle ID specifying a vehicle (vehicle information), the ground ID specifying the ground information, and the running time T.

In more detail, in addition to the vehicle information, the ground information and the information of the running time, a shortest running time in the vehicle ID and the ground ID, and a velocity, a position, an instantaneous power, a cumulative power, and a notch number at each time instant of the set running time are described. If the vehicle ID, the ground ID and data of the running time T which have been inputted to the running curve input processing unit 13 are in the state to be previously stored in the running curve creation result storage unit 16, the data is transferred to the running curve creation result display unit 17, without creating a running curve, and the result should be displayed on the running curve creation result display unit 17.

Figure 17:
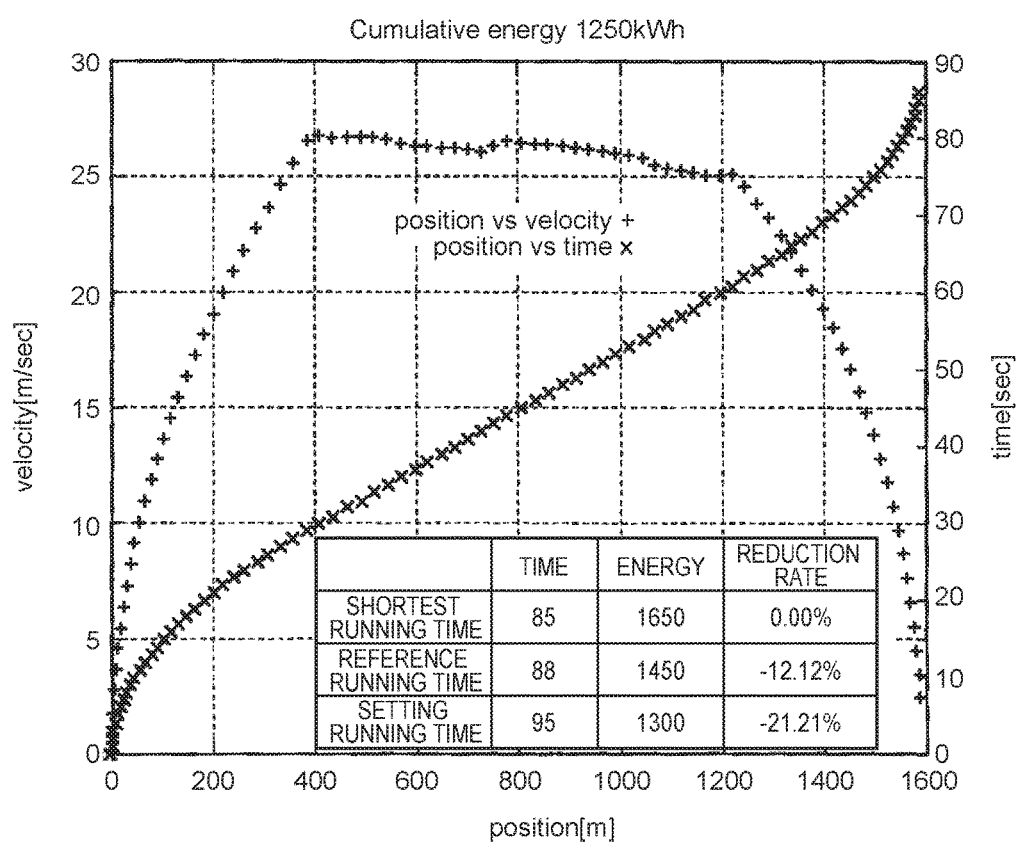
FIG. 17 is a diagram of a running curve which has been visualized, based on the storage data of the running curve creation result storage unit.

FIG. 17 is a diagram of a running curve which has been visualized, based on the storage data of the running curve creation result storage unit.

And the display 28 functioning as the running curve creation result display unit 17 displays a result of a running curve of the running time T which has been created in the energy saving running curve creation unit 15.

Figure 18:
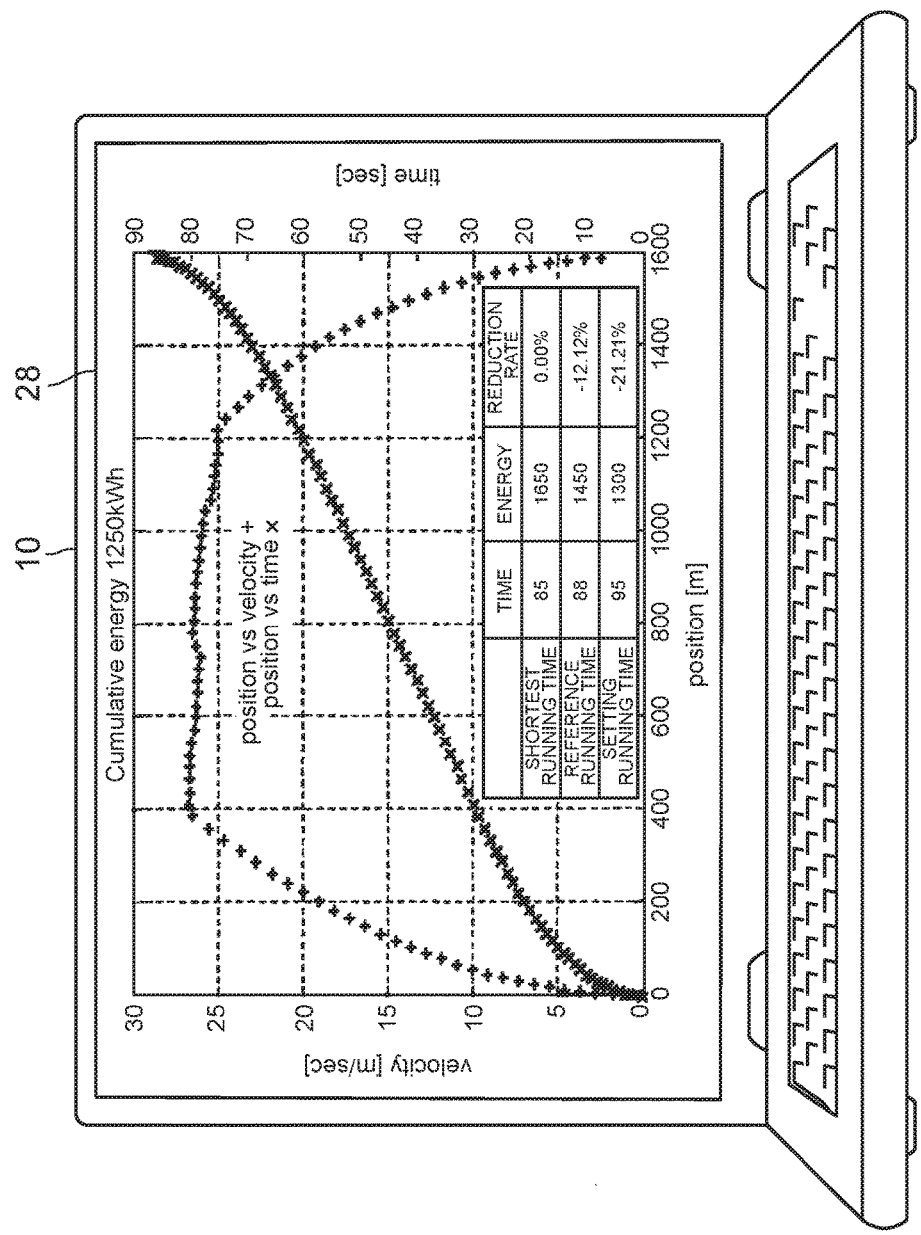
FIG. 18 is a diagram showing an example of the running curve to be displayed on a display.

FIG. 18 shows an example of a running curve to be displayed on the display.

A running curve in the railway business world is a curve wherein a position is taken on the horizontal axis, and a velocity and a position are plotted on the vertical axis.

Also in the present embodiment, a running curve is displayed as shown in FIG. 18.

In addition, in the display 28 functioning as the running curve creation result display unit 17, the results of the cumulative energy consumption amounts in the other running times can be compared, and the reduction rates in a cumulative energy consumption amount can be compared. In the present embodiment, focusing one between-station of a certain route for simplification, a result of a running curve thereof has been displayed, but it is possible to easily create a running curve of the whole route from the respective results between stations.

In addition, when the inputted running time T is smaller than the shortest running time $T_{min}$, since such running is not physically enabled, it is only necessary to display that such running is not enabled in the inputted running time on the running curve creation result display unit 17.

In addition, when the inputted running time T is longer than the shortest running time Tmin, and when data of a running curve does not exist in the running curve creation result storage unit 16, it is notified to the running curve input processing unit 13 that the data does not exist in the running curve creation result storage unit 16, and thereby the running curve input processing unit 13 may start the running curve creation processing.

As described above, according to the present embodiment, it becomes possible to create a running curve which is closer to an optimum solution at high speed.

Further, it becomes possible to automatically create a running curve which is more operable to a driver.

In the above description, the running curve creation device 10 has been realized as a personal computer, but it can be realized as a server, or it can be configured to be realized as a so-called cloud on a network.

In the above-described configuration, it is not necessary to provide the running curve creation result display unit in an integrated manner, but it is possible to configure to arrange such unit at a user side.

The control program to be executed in the running curve creation device of the present embodiment is presented while being recorded in a computer readable recording medium, such as a CD-ROM, a flexible disk (FD), a CD-R, a DVD (Digital versatile Disk) in a file form of an installable format or an executable format.

In addition, the control program to be executed in the running curve creation device of the present embodiment may be configured such that the control program is stored on a computer connected to a network such as Internet, and is provided by being downloaded through the network. In addition, the control program to be executed in the running curve creation device of the present embodiment may be configured such that the control program is provided or distributed through a network such as Internet.

In addition, the control program of the running curve creation device of the present embodiment may be configured such that the control program is provided while being incorporated in a ROM or the like.

The control program to be executed in the running curve creation device of the present embodiment has a module configuration including the above-described respective units (the running curve input processing unit, the shortest time running curve creation unit, the energy saving running curve creation unit, the running curve creation result display unit), and regarding an actual hardware, the CPU (processor) reads the control program from the above-described storage medium and executes it, and thereby the above-described respective units are loaded on the main storage device, and the running curve input processing unit, the shortest time running curve creation unit, the energy saving running curve creation unit, the running curve creation result display unit are configured to be generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A running curve creation device to create a running curve which can make a train having a prescribed vehicle characteristic run between a prescribed departure station and a prescribed arrival station in a prescribed running time in a relatively small cumulative energy consumption, the running curve creation device comprising:
    a shortest time running curve creation unit to create a shortest time running curve in which the train runs between the stations in a shortest time, based on predetermined vehicle information and ground information of the train; and
    an energy saving running curve creation unit which (i) sets the shortest time running curve as an upper limit value, (ii) sets a running curve which is obtained by moving the shortest time running curve along a time axis direction by the prescribed running time as a lower limit value, (iii) selects, from a plurality of solution candidates corresponding to states of the train at each prescribed elapsed time since the train has departed from the departure station, a solution candidate located between the upper limit value and the lower limit value and having the relatively small cumulative energy consumption in the prescribed running time, and (iv) creates an energy saving running curve based on the selected solution candidate.

2. The running curve creation device according to claim 1, wherein:
    the state of the train is a distance from the departure station and a velocity of the train at the each prescribed elapsed time; and
    the energy saving running curve creation unit creates the energy saving running curve by making, for each combination of a prescribed distance range from the departure station and a prescribed velocity range, any one state belonging to the each combination, as the solution candidate representing the relevant combination.

3. The running curve creation device according to claim 1, wherein:
    acceleration and deceleration of the train are performed by notch changeover; and
    the energy saving running curve creation unit excludes the state of the train in which a number of times of notch changeover exceeds a prescribed number, from the solution candidate.

4. The running curve creation device according to claim 1, wherein:
    acceleration and deceleration of the train are performed by notch changeover; and
    the energy saving running curve creation unit excludes the state of the train in which a continuous time of the same notch is less than a prescribed continuous time, from the solution candidate.

5. The running curve creation device according to claim 1, wherein:
    the vehicle information of the train includes a type of the vehicle, a vehicle body weight, a riding rate, a number of vehicles of a formation, a train length.

6. The running curve creation device according to claim 1, wherein:
    the ground information includes information of a between-station distance, velocity limitation information including a section position and an upper limit velocity corresponding to the relevant section position, and gradient information in the advancing direction.

7. A running curve creation method to create a running curve which can make a train having a prescribed vehicle characteristic run between a departure station and an arrival station in a prescribed running time with a relatively small cumulative energy consumption, the running curve creation method comprising:
    a shortest time running curve creation step to create a shortest time running curve in which the train runs between the departure station and the arrival station in a shortest time, based on vehicle information and ground information of the train; and
    an energy saving running curve creation step which (i) sets the shortest time running curve as an upper limit value, (ii) sets a running curve which is obtained by moving the shortest time running curve along a time axis direction by the prescribed running time as a lower limit value, (iii) selects, from a plurality of solution candidates corresponding to states of the train at each prescribed elapsed time since the train has departed from the departure station, a solution candidate located between the upper limit value and the lower limit value and having the relatively small cumulative energy consumption in the prescribed running time, and (iv) creates an energy saving running curve based on the selected solution candidate.

8. The running curve creation method according to claim 7, further comprising:
an acquisition step to acquire the ground information, the vehicle information and the prescribed running time; wherein:
the shortest time running curve creation step has an acceleration limit curve creation step which, from information including an initial condition of a velocity and a position in which a maximum acceleration is used, creates an acceleration limit curve indicating the velocity and the position when the maximum acceleration is used; and a deceleration limit curve creation step which searches a condition to satisfy a terminal condition, and creates a deceleration limit curve indicating the velocity and the position when a maximum deceleration is used.

9. The running curve creation method according to claim 8, wherein:
the condition of the solution includes a number of times of notch changeover, a notch continuation time, in addition to the position and the velocity.

10. The running curve creation method according to claim 7, wherein: the energy saving running curve creation step, when the train runs between the departure station and the arrival station in the prescribed running time, and when a position at an elapsed time t when the train runs between the stations in a shortest running time Tmin is made Upper[t], and a relation which is obtained by moving (t, Upper[t]) in the shortest running time in parallel in the time axis direction by a difference between the prescribed running time and the shortest running time Tmin is made (t, Lower[t]),
if an orbit of a solution in which the energy consumption amount in the prescribed running time becomes minimum is made (t, v(t), x(t)), satisfies Lower[$t$]≤$x(t)$≤Upper[$t$].

11. The running curve creation method according to claim 7, wherein:
the energy saving running curve creation step further has a quantization step which quantizes a position and a velocity by dividing each of them by a definite width, and selects one having the smallest cumulative energy consumption amount in a divided region as one of the solution candidates.

12. The running curve creation method according to claim 7, wherein:
acceleration and deceleration of the train are performed by notch changeover; and
the energy saving running curve creation step excludes the state of the train in which a number of times of notch changeover exceeds a prescribed number, from the solution candidate.

13. The running curve creation method according to claim 7, wherein:
acceleration and deceleration of the train are performed by notch changeover; and
the energy saving running curve creation step excludes the state of the train in which a continuous time of the same notch is less than a prescribed continuous time, from the solution candidate.

14. A non-transitory computer readable storing medium storing a control program for controlling, by a computer, a running curve creation device to create a running curve which can make a train having a prescribed vehicle characteristic run between a prescribed departure station and a prescribed arrival station in a prescribed running time with a smaller cumulative energy consumption, the control program making the computer function as units comprising:
a shortest time running curve creation unit to create a shortest time running curve in which the train runs between the stations in a shortest time, based on predetermined vehicle information and ground information of the train; and
an energy saving running curve creation unit which (i) sets the shortest time running curve as an upper limit value, (ii) sets a running curve which is obtained by moving the shortest time running curve along a time axis direction by the prescribed running time as a lower limit value, (iii) selects, from a plurality of solution candidates corresponding to states of the train at each prescribed elapsed time since the train has departed from the departure station, a solution candidate located between the upper limit value and the lower limit value and having the relatively small cumulative energy consumption in the prescribed running time, and (iv) creates an energy saving running curve based on the selected solution candidate.

* * * * *